US008428564B2

(12) United States Patent
Reilly (10) Patent No.: US 8,428,564 B2
(45) Date of Patent: Apr. 23, 2013

(54) METHOD AND APPARATUS FOR PROVIDING UPDATED CONTENT DATA TO A MOBILE TERMINAL (75) Inventor: Paul Jefferson Reilly, Cambridge (GB)

(73) Assignee: QUALCOMM Incorporated, San Diego, CA (US)

( * ) Notice: Subject to any disclaimer, the term of this patent is extended or adjusted under 35 U.S.C. 154(b) by 832 days.

(21) Appl. No.: 12/045,548

(22) Filed: Mar. 10, 2008

(65) Prior Publication Data
US 2008/0153468 A1    Jun. 26, 2008

Related U.S. Application Data (63) Continuation of application No. 10/503,793, filed on Aug. 6, 2004, now Pat. No. 7,363,035.

(30) Foreign Application Priority Data

Feb. 7, 2002 (GB) .................................. 0202865.2
Mar. 22, 2002 (GB) .................................. 0206802.1
Nov. 28, 2002 (GB) .................................. 0227751.5

(51) Int. Cl.
H04M 3/42    (2006.01)
H04W 4/00    (2009.01)

(52) U.S. Cl.
USPC ........................................ 455/414.1; 455/466

(58) Field of Classification Search .................. 370/328, 370/338, 310, 312, 329, 345; 455/406, 414, 455/417, 466, 445, 413, 412.2, 450
See application file for complete search history.

(56) References Cited

U.S. PATENT DOCUMENTS

| 5,701,580 | A | 12/1997 | Yamane et al. |
| 6,163,779 | A | 12/2000 | Mantha et al. |
| 6,272,332 | B1 * | 8/2001 | Matsumoto et al. ....... 455/412.1 |
| 6,370,134 | B1 * | 4/2002 | Aramaki ....................... 370/342 |
| 6,404,754 | B1 | 6/2002 | Lim |
| 6,405,060 | B1 | 6/2002 | Schroeder et al. |
| 6,608,556 | B2 | 8/2003 | De Moerloose et al. |
| 6,675,219 | B1 * | 1/2004 | Leppinen et al. ............. 709/230 |
| 6,701,154 | B2 | 3/2004 | Ito |
| 6,804,537 | B1 * | 10/2004 | Fujii ............................. 455/557 |
| 6,876,661 | B2 | 4/2005 | Asai |

(Continued)

FOREIGN PATENT DOCUMENTS

| GB | 2366877 | 3/2002 |
| GB | 2367661 | 4/2002 |

(Continued)

OTHER PUBLICATIONS

British Patent Office Search Report, Apr. 24, 2003.

(Continued)

Primary Examiner — Michael Faragalla
(74) Attorney, Agent, or Firm — Nicholas A. Cole (57) ABSTRACT The invention provides a method of providing content to a mobile terminal, the method comprising the steps of: receiving data at the mobile terminal; classifying the content data in accordance with classification data comprised within the content data; storing the content data within the mobile terminal; creating an access object whereby the content data may be accessed; and associating the access object with further access objects having similar classification codes. This method has a significant effect in simplifying the provision of content to mobile terminals.

60 Claims, 4 Drawing Sheets

U.S. PATENT DOCUMENTS

| | | | |
|---|---|---|---|
| 6,879,842 B2 | 4/2005 | King et al. | |
| 7,363,035 B2* | 4/2008 | Reilly | 455/432.3 |
| 2002/0054087 A1 | 5/2002 | Noll et al. | |
| 2002/0156832 A1* | 10/2002 | Duri et al. | 709/203 |
| 2004/0133918 A1* | 7/2004 | Danker | 725/100 |
| 2004/0203737 A1* | 10/2004 | Myhre et al. | 455/426.1 |
| 2006/0115238 A1* | 6/2006 | Sako et al. | 386/94 |

FOREIGN PATENT DOCUMENTS

| | | |
|---|---|---|
| GB | 2379289 | 3/2003 |
| WO | WO0055741 | 2/2000 |
| WO | WO0103403 | 1/2001 |
| WO | WO 01/86503 * | 11/2001 |
| WO | WO0186503 | 11/2001 |
| WO | WO0193485 | 12/2001 |

OTHER PUBLICATIONS

International Search Report, PCT/GB03/00564, International Search Authority EPO, May 22, 2003.

Keller, R. M. et al.: "A bookmarking service for organizing and sharing URLs", Computer Networks and ISDN Systems 29 (1997) pp. 1103-1114, Sep. 1, 1997.

Qusay Mahmoud, "MIDP Database Programming Using RMS: a Persistent Storage for MIDlets," Release 1.0, Sun Microsystems, Dec. 2000. http://developers.sun.com/mobility/midp/articles/persist/ (Sep. 11, 2009).

"Mobile Information Device Profile (JSR-37)"; JCP Specification, Java 2 Platform, Micro Edition, 1.0a. Sun Microsystems, Dec. 15, 2000.

* cited by examiner

METHOD AND APPARATUS FOR PROVIDING UPDATED CONTENT DATA TO A MOBILE TERMINAL

CROSS-REFERENCE TO RELATED APPLICATIONS

The subject application is a continuation of and claims priority from U.S. patent application Ser. No. 10/503,793, filed in PCT on Feb. 7, 2003, and entitled "Method and Apparatus for Providing Content to a Mobile Terminal," the disclosure of which is incorporated herein by reference in its entirety.

BACKGROUND

1. Field

This invention relates to the field of providing content to a mobile terminal and in particular to classifying and storing content data within a mobile terminal.

2. Description of the Related Art

It is already possible to use a mobile handset for browsing remote content using wireless technology for the communications link. This content might be from the Internet, or may be specifically created for mobile telephone handsets, using, for example the Wireless Application Protocol, (WAP). The user typically initiates such a session by starting the browser in his terminal, and either entering an address for the content he wishes to access, or more conveniently, selecting a bookmark which provides a shortcut to the address, the bookmark having been entered and stored previously. The address may conveniently follow the well-established URL (Uniform Resource Locator) format.

Such browsing behaviour is distinct from the other mode of usage of the handset, namely local or non-connected use, such as managing the local address book content, or playing a local game. There are a number of drawbacks for the user in this means of accessing remote content in terms of usability, which include, amongst other factors, entering a URL is quite laborious and error-prone, especially on a small mobile handset which typically does not have a full-size QWERTY layout keyboard; where bookmarks are used, they risk becoming out of date and they are also difficult to manage within a small screen user interface (UI), requiring The user to create categories (if such a feature exists on the handset) and remember their meaning; and there is no effective non-intrusive means for the owner of remote content to present or push content to the user. This goal can be achieved only by persuading the user to visit/bookmark his site, or by sending the user a message containing the bookmark, which is generally considered intrusive and annoying.

This invention offers a solution to the usability problem, and presents a greatly improved means for the user to find relevant remote content when he needs it, and for the owner of remote content to present relevant services in a manner that is convenient, attractive and non-intrusive.

SUMMARY

In one aspect, a method of processing updated content data on a mobile terminal is presented. The method may store local content data on the mobile terminal. The local content data may contain local characteristic data. The method may select the local content data and may determine whether remote content data is required. The remote content data may have remote characteristic data similar to the local characteristic data. If remote content data is required, the method may receive remote content data at the mobile terminal and may install the remote content data within the local content data. The installed remote content data and local content data may become updated content data. The method may then present the updated content data. The local content data may be accessible on the mobile terminal when the mobile terminal does not have access to a wireless communications network. The local content data and remote content data may be displayed differently based on availability. The remote content may be validated before the remote content data is installed within the local content data, the validated remote content data being suitable for use with the mobile terminal. Determining whether remote content data is required may be based on user preferences. Local content data may be accessible free of charge and received remote content data may be accessible for an additional charge. Further, the received remote content data may be classified at a first time as local content data and may be subsequently accessible free of charge. The updated content data may be presented at a start time. The updated content data may expire after an expiry time and may no longer be presented for access on the mobile terminal. The local characteristic data may specify a fixed slot for the installation of the remote content data. The fixed slot may be determined during configuration of the mobile terminal. The local characteristic data and remote characteristic data may contain a content category, respectively, and the content category may correspond to a menu structure into which the remote content data will be installed. Also, the content category may allow the remote content data to be referenced from multiple menu structures.

In another aspect, a mobile terminal is presented. The mobile terminal may have means for storing local content data on the mobile terminal. The local content data may contain local characteristic data. The mobile terminal may have means for selecting the local content data and may have means for determining whether remote content data is required. The remote content data may have remote characteristic data similar to the local characteristic data. If remote content data is required, the mobile terminal may have means for receiving remote content data at the mobile terminal and may have means for installing the remote content data within the local content data. The installed remote content data and local content data may become updated content data. The mobile terminal may have means for presenting the updated content data. The local content data may be accessible on the mobile terminal when the mobile terminal does not have access to a wireless communications network. The local content data and remote content data may be displayed differently based on availability. The remote content may be validated by means for validation before the remote content data is installed within the local content data, the validated remote content data being suitable for use with the mobile terminal. Determining whether remote content data is required may be based on user preferences. Local content data may be accessible free of charge and received remote content data may be accessible for an additional charge. Further, the received remote content data may be classified at a first time as local content data and may be subsequently accessible free of charge. The updated content data may be presented at a start time. The updated content data may expire after an expiry time and may no longer be presented for access on the mobile terminal. The local characteristic data may specify a fixed slot for the installation of the remote content data. The fixed slot may be determined during configuration of the mobile terminal. The local characteristic data and remote characteristic data may contain a content category, respectively, and the content category may correspond to a menu structure into which the remote content data will be installed. Also, the content category may allow the remote content data to be referenced from multiple menu structures.

In another aspect, a computer-program product for processing updated content data on a mobile terminal is presented. The computer-program product may have a computer readable medium having instructions. The instructions may store local content data on the mobile terminal. The local content data may contain local characteristic data. The instructions may select the local content data and may determine whether remote content data is required. The remote content data may have remote characteristic data similar to the local characteristic data. If remote content data is required, the instructions may receive remote content data at the mobile terminal and may install the remote content data within the local content data. The installed remote content data and local content data may become updated content data. The instructions may present the updated content data. The local content data may be accessible on the mobile terminal when the mobile terminal does not have access to a wireless communications network. The local content data and remote content data may be displayed differently based on availability. The remote content may be validated before the remote content data is installed within the local content data, the validated remote content data being suitable for use with the mobile terminal. Determining whether remote content data is required may be based on user preferences. Local content data may be accessible free of charge and received remote content data may be accessible for an additional charge. Further, the received remote content data may be classified at a first time as local content data and may be subsequently accessible free of charge. The updated content data may be presented at a start time. The updated content data may expire after an expiry time and may no longer be presented for access on the mobile terminal. The local characteristic data may specify a fixed slot for the installation of the remote content data. The fixed slot may be determined during configuration of the mobile terminal. The local characteristic data and remote characteristic data may contain a content category, respectively, and the content category may correspond to a menu structure into which the remote content data will be installed. Also, the content category may allow the remote content data to be referenced from multiple menu structures.

In another aspect, a mobile terminal is presented. The mobile terminal may have a transceiver for receiving remote content data. The mobile terminal may also have a display device. Further, the mobile terminal may have a memory for storing local content data on the mobile terminal. The local content data may contain local characteristic data. The mobile terminal may have a user input device for selecting the local content data. Further, the mobile terminal may have a processor for determining whether remote content data is required. The remote content data may have remote characteristic data similar to the local characteristic data. If remote content data is required, the processor may be operable to receive remote content data at the mobile terminal via the transceiver. The processor may install the remote content data within the local content data. The installed remote content data and local content data may be updated content data stored on the memory. Also, the processor may present the updated content data on the display device. The local content data may be accessible on the mobile terminal when the mobile terminal does not have access to a wireless communications network. The local content data and remote content data may be displayed on the display device differently based on availability. The processor may validate the received remote content data before installing the remote content data within the local content data, the validated remote content data may be suitable for use with the mobile terminal. The processor may determine whether remote content data is required is based on user preferences. The local content data may be accessible free of charge and received remote content data may be accessible for an additional charge. The received remote content data may be classified by the processor at a first time as local content data and may be subsequently accessible free of charge. The updated content data may be presented at a start time. The updated content data may expire after an expiry time and may no longer be presented for access on the mobile terminal. The local characteristic data may specify a fixed slot for the installation of the remote content data. The fixed slot may be determined during configuration of the mobile terminal. The local characteristic data and remote characteristic data may further contain a content category, respectively. The content category may correspond to a menu structure into which the remote content data may be installed. The content category may allow the remote content data to be referenced from multiple menu structures.

According to a first aspect of the invention there is provided a method of providing content data to a mobile terminal, the method comprising the steps of the mobile terminal: (a) receiving content data transmitted by a content server; (b) classifying the content data in accordance with classification data; (c) storing the content data within the mobile terminal; (d) creating an access object whereby the content data may be accessed; and (e) associating the access object with further access objects having similar classification data, the method being characterised in that step (b) comprises classifying the content data in accordance with classification data comprised within the content data.

According to a second aspect of the invention there is provided a content installation module for a mobile terminal, the module, in use: classifying content data received by the mobile terminal in accordance with classification data; storing the content data within storage means within the mobile terminal; creating an access object to access the content data; the access object being associated with further access objects having similar classification data, the method being characterised in that classifying the content data comprises classifying the content data in accordance with classification data comprised within the content data.

Computer software programs for implementing the first and second aspects of the present invention may be provided on computer readable data carriers. The content data may be content for display by the terminal, such as text, audio, video, etc., or it may be an object that can be executed by the terminal, for example an application such as a Java applet or a MIDlet.

BRIEF DESCRIPTION OF THE DRAWINGS

The invention will now be described, by way of example only, with reference to the following Figures in which.

DETAILED DESCRIPTION

Figure 1:
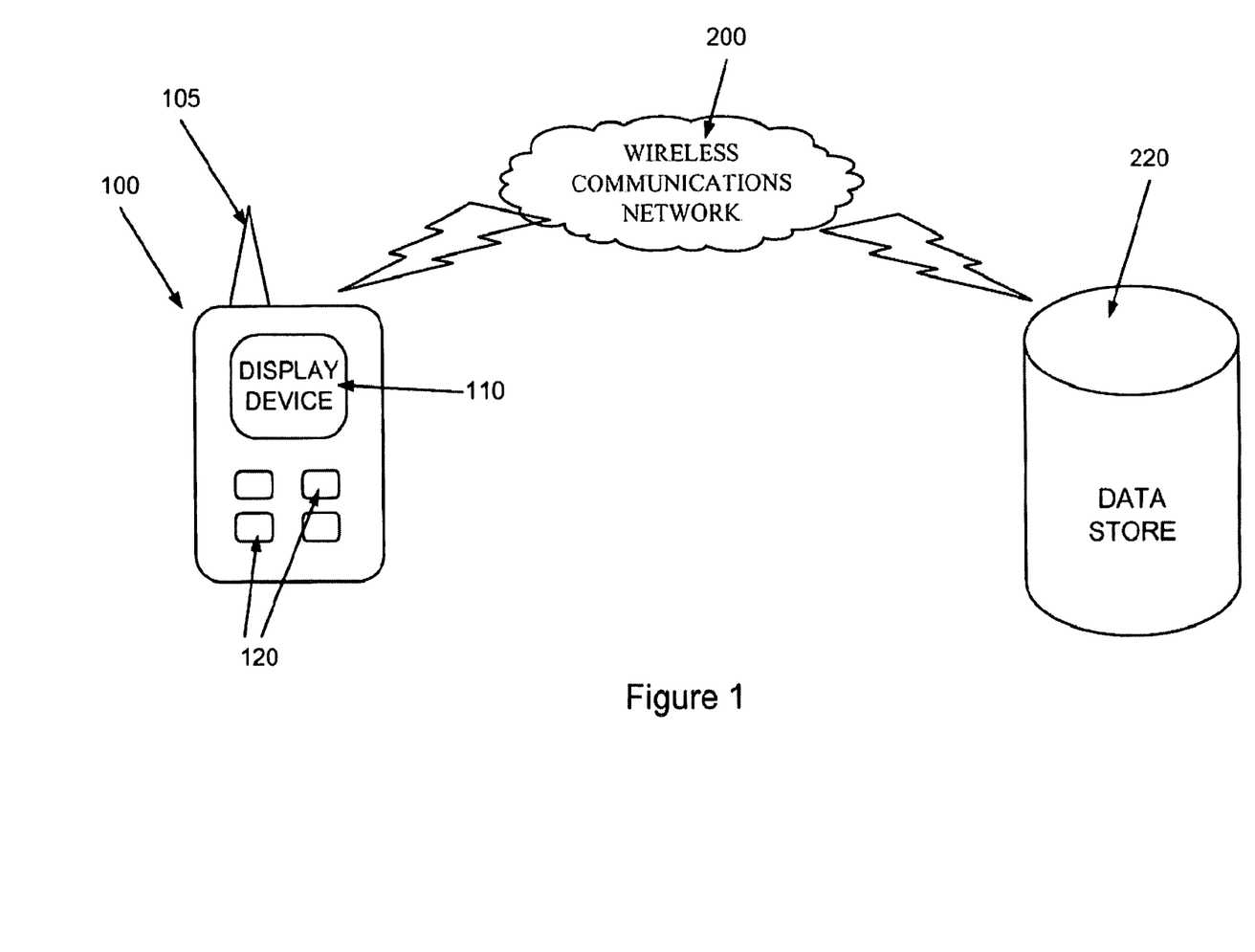
FIG. 1 is a schematic depiction of a mobile terminal according to the present invention.

FIG. 1 shows a mobile terminal 100 suitable for use with the present invention. The mobile terminal 100 comprises a radio antenna 105, a display device 110 and a user input device 120. The display device 110 displays a number of items, such as a viewable text or an image, that comprise or are associated with a hyperlink. Selecting the hyperlink using the user input device 120 causes the mobile terminal 100 to display a further item or items associated with the hyperlink, for example a menu of options or a data file. The item (or items) associated with the mobile terminal 100 may be stored locally within the mobile terminal 100 or on a remote data store 220, which is connected to the mobile terminal by wireless communications network 200. Both local and remote items are presented together to the user on the display device 110, although an indication may be given to the user as to whether an item is stored locally or remotely. For example, the display device might show a menu having the options of 'News', 'Sport', 'Entertainment', 'Business', 'Games' and 'Horoscope'. Selecting the 'News' menu may bring up a list of several headlines which are stored locally and have been downloaded from a content provider's data store 220 that is connected to the mobile terminal 100 by wireless communications network 200. Selection of one of these headlines will cause the mobile terminal 100 to connect to the remote data store 220 to download the content (text, audio, video, etc) that is associated with the selected headline. A number of similar arrangements may be provided for the other menus, with some content being stored locally and some remotely. The menus may contain a number of submenus, for example the 'News' menu could link to a number of headlines and/or a number of submenus, for example 'National News', 'Local News', 'International News', 'Political News', etc. For example, if the user enters a birth date into a locally based application this can be supplied to a remote application that generates a horoscope for that birth date. The horoscope could be stored locally on the mobile terminal or a local hyperlink could reference the appropriate horoscope data stored on a remote data store.

The user interface (UI) for such a mobile terminal 100 is conveniently created using a mark-up language (ML) that creates user screens locally using a UI engine 150 that can generate ML compliant data that is rendered by a browser 160 for display on the display device 110. Typical mark-up languages used with mobile terminals are HTML (Hyper Text Mark-up Language) or WML (Wireless Mark-up Language).

It will be clear from the above that it is necessary for the terminal to receive episodic updates of data content to be stored locally and hyperlinks, along with any associated content, to refer to remotely stored content. These updates need to be received over the wireless communications network 200 and then installed within the mobile terminal 100 such that the content is correctly stored within a menu-based hierarchy so that it can be accessed by a user.

Figure 2:
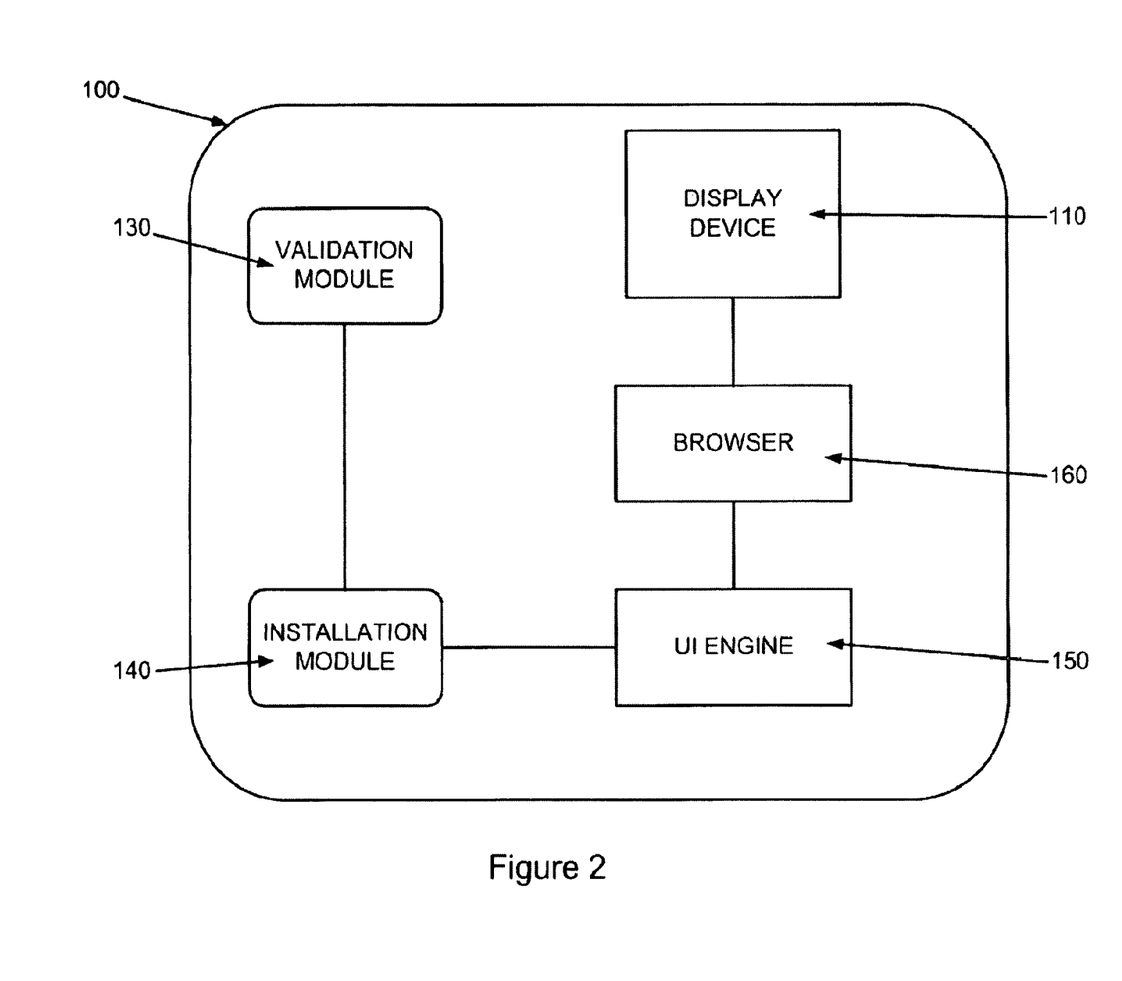
FIG. 2 is a schematic depiction of the process whereby content is provided to the mobile terminal.

FIG. 2 shows a schematic depiction of the process whereby content is transmitted to the mobile terminal 100. The content data is transmitted to the mobile terminal 100 over the wireless communications network 200. The incoming content data is processed by a validation module 130 to ensure that transmission has taken place correctly (for example, the use of error checking and/or error correcting codes) and that the content is suitable for use with the mobile terminal 100 (for example that the mobile terminal 100 has sufficient storage capacity to store the content, that the content type [e.g. video, audio, text, etc] is suitable for the particular mobile terminal 100, etc.).

The content data is then processed by the installation module 140 and an entry is made in a log file to assist in the subsequent management and deletion of the content data. Preferably, the content data includes one or more of the following characteristics:

A unique identifier to simplify the deletion, modification or overwriting of the content data.

A version number corresponding to the minimum version of the installation module (140) for which this content data will operate successfully.

A content category, to allow the installer to place the content in the most suitable location within the menu structure and within a page. Nested or hierarchical categories allow the content to be referenced from multiple menus and submenus.

A start date & time, before which the content will not be available to the user.

An expiry date & time, after which the content will no longer be available to the user.

A tag to indicate whether the user has the right to delete the content.

A tag to indicate whether the user has the right to shave the content with other mobile terminals.

A data payload, which can consist of viewable content (text or images), animated graphics, other multimedia content such as audio and video, telephone numbers and descriptors, email addresses and descriptors, logical elements to manage local behaviour, such as JavaScript components, links to new installed pages, links to remote content, means to install pages into the user interface tree, etc.

A Digital Rights Management (DRM) scheme may be used to protect the data payload from unauthorized copying, sharing, or excessive use.

An example of such content data is given below in Appendix A using XML (extended Mark-up Language), which has the potential for providing far greater functionality than the more conventionally used HTML. Preferably, the installation module is implemented using XML so that functionality upgrades might easily be applied.

The nature and type of content that is provided to a mobile terminal 100 may be controlled directly by the terminal user, or the user may register a number of interests and preferences with one or more content providers. Local content will generally be provided free of charge whilst the user may be charged to access some remote content, which may then be stored locally once it has been paid for. Advertising may be used to subsidize the cost of content provision. Potential content and thus the nature of links to remotely stored content are virtually unlimited and may include, without restriction, news, sports, jokes, digital music (for example MP3 files) and music information, access to network operator and terminal manufacturer support services, games and on-line gaming, new, user billing and account details, directory services, m-commerce merchants, etc. The local content may be displayed so as to appear different to remote content i.e. through using different text fonts or colours, or through the insertion of an icon next to the links in question. This communicates to the user that there may be a cost or transmission delay before the content can be accessed.

Figure 3:
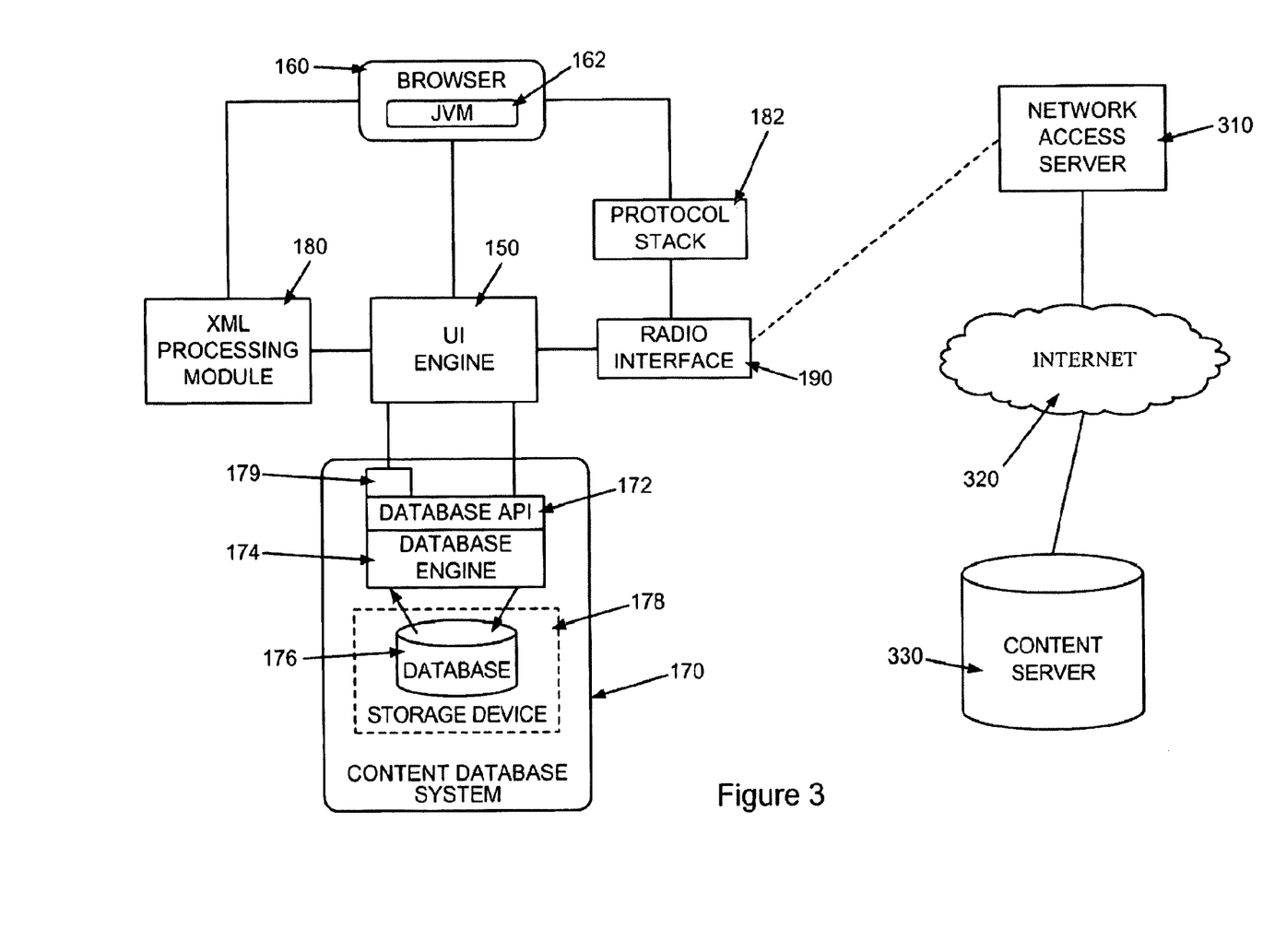
FIG. 3 is a schematic depiction of the processes whereby data content is displayed on the display device 110 of the mobile terminal 100.
Figure 4A:
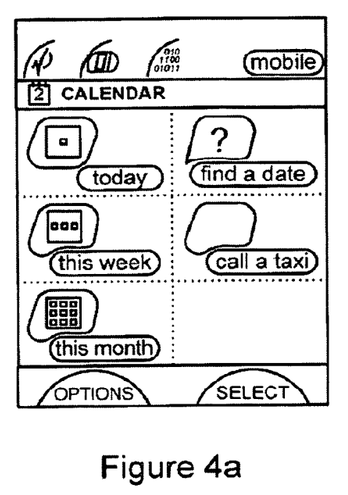
FIG. 4 is a schematic depiction of the representation of local and remote content on a mobile terminal.
Figure 4B:
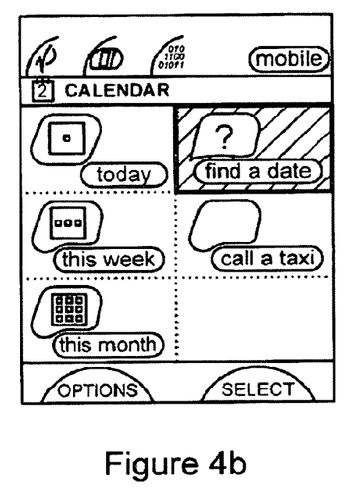
Figure 4C:
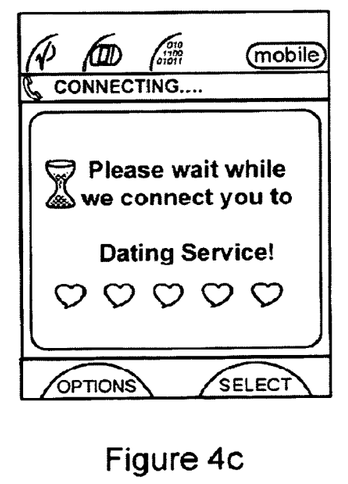
Figure 4D:
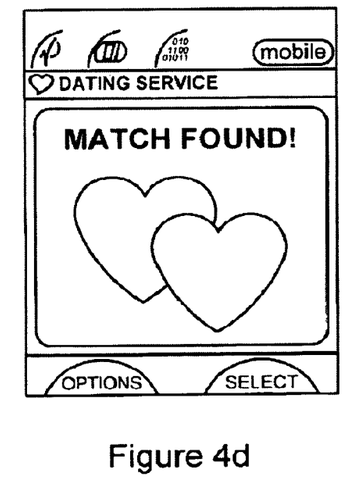

FIG. 3 shows a schematic depiction of the processes whereby data content is displayed on the display device 110 of the mobile terminal 100. The data content is displayed through the rendering of mark-up language compliant data by the browser 160. The browser may comprise a Java Virtual Machine (JVM) 162 to enable Java applets to be executed by the mobile terminal 100 (or alternatively a discrete JVM may be provided). The user selects a hyperlinked data item using the user input device 120 and the UI engine 150 interprets this selection and identifies whether the data item referred to by the hyperlink is stored locally (i.e. within the mobile terminal 100 or an associated storage device) or remotely (i.e. on a content server which is connected to the mobile terminal 100 by The wireless communications network 200).

If the data item is stored locally, then the UI engine 150 sends a request to the content database system 170, which comprises a database API 172, a database engine 174 and a database 176, the database being stored on a storage device 178. The UI engine 150 request is interpreted by the database API 172 and the interpreted request is passed on to the database engine 174. The database engine 174 then queries the database 176 using the interpreted request and the database 176 returns the raw content data associated with the original UI engine 150 request to the database engine 176, which forwards the data to the database API 172. The database API 172 then plaices the raw content data within an XML wrapper and sends it to the UI engine 150. Depending upon the nature of the content data and any user preferences, the UI engine 150 may send the content data directly to the browser 160, where the content is rendered and displayed to the user. Alternatively the UI engine 150 may apply one or more XSL (extended style language) style sheets to format the content data (which may include encoding the data into another format that is more suitable for rendering by the browser 160, for example HTML or WML), before sending the data to the browser 160, where the formatted data is rendered and presented to the user in the desired format.

If the data item that is selected by the user choosing a hyperlink is stored remotely then the UI engine 150 prompts the browser 160 to send a request to the network location indicated by the selected hyperlink. The browser's 160 request is sent via the protocol stack 182 that is required for successful communication over the wireless communications network 200. The protocol stack 182 comprises the standard TCP/IP protocols which allow the mobile terminal 100 to communicate with internet hosts and the transport and physical layer protocols, for example the third generation UMTS protocols, that enable the mobile terminal 100 to access and communicate over the wireless communications network 200. The mobile terminal 100 establishes a communications link between the radio interface 190 a network access server (NAS) 310 that routes the browser's 160 request to the appropriate content server 330, via the Internet 320.

The content server 330 will chock that the mobile terminal 100 that originated the request is allowed to access the requested content (e.g. a registered user of the content server 330, sufficient credit in account to buy the content, etc.). The content is then transmitted across the Internet to the NAS 310, where it is then transmitted across a wireless communications link to the mobile terminal 100 where it is received at the radio interface 190. The data content packets will then pass through the protocol stack 182 from which the content can be extracted and the content passed to the browser 160. Dependent upon the nature and format of the content, the browser 160 may be able to render it (either directly or using additional functionality provided by 'plug-in' modules) for display on the display device 110 or the content data may be forwarded to the UI engine 150 in order to have an XSL style sheet applied in order to transform the content data into a format that can be rendered by the browser 160. It will be understood that the XML and XSL processing of data may be centralised, for example in the UI engine 150, the browser 160, or in a separate XML processing module 180, or distributed within more than one of the entities discussed above, with some processing being performed when data is sent by and/or received at the entity.

If the content is a MIDlet (Mobile Information Device Application) TD then the JVM 162 will instantiate the MIDlet (or install and instantiate the MIDlet if it is remotely located) without applying style sheets to the MIDlet.

As is described above, the remote content will have a content tag, which may conveniently be incorporated into the page description as HTML tags, for example <category1>Sport</category1>. In this case the installation module 140 will look for a Sport menu (or submenu) from which the content can be accessed. In addition, the content might be accessed from additional menus for the most recently downloaded or most recently accessed content. If the tag is, for example, Football then the installation module may recognize that Football is a subset of Sport and store the content under the Sport menu if there is no Football submenu.

If there is no dedicated Sport menu then a link to the content may be added to a General or Miscellaneous menu so that the user may access the content. Alternatively the installation module 140 may prompt the user to generate a Sport menu and then store the link for the new content within that menu. In a further alternative, the remote content may be displayed in a random sequence. Furthermore, tags may be inserted within the content, such as <category2>Advertisement</category2>located at a point considered by the content layout designer as being suitable for the insertion of an advertisement.

Some content may include multiple tags, for example 'Sport and Advertising'. On receipt of this content, the installation module 140 will attempt to insert the content into a Sport menu at the first point where a vacant Advertising tag exists. It no such Advertising tag is found, the installation module 140 may attempt to insert it at the bottom of the Sport page. If multiple Sport menus and submenus are found, the installation module 140 will place the content within the highest level of the menu hierarchy. New content can be installed within menus that have been created by previous installations and if the content is an update or a development of previously downloaded content then new content may be inserted into or used to overwrite the previously downloaded content.

Installed remote content may be deleted by the user (unless the permission tag indicate the user may not), by the expiration of the expiry time and date, remotely by a command sent over the network using the content's unique identifier. Pages cannot be deleted or expired if they in turn have had newer content installed onto them, which has not yet been deleted or expired. Advantageously the user may have visibility of all content that has been installed onto his mobile terminal 100, for example by chronological order, as well as ability to remove some or all of the installed content simultaneously.

Content can be installed in one of two methods. The installation module 140 may insert the received content into the pages already in the database, following a cut and paste model, whilst maintaining a log of insertions (the content and the recipient pages) to allow it to remove the content later.

Alternatively, the received content may be placed in a separate library, and a link to the content being inserted into the target page. In this latter case, the UI engine 150 must dynamically follow the link in order to build the full page. An advantage of using this method is that page content can be varied, according to user preference, and is more able to present remote content in an optimally located way. For example, if a sports advertisement is received but no sports page exists yet, the installation module 140 will default to putting the sports advertisement in some general or miscellaneous page. However, if a sports page is received and installed some time later, the installation module 140 may then move the link for the sports advertisement to the more appropriate location.

As an alternative to putting received content into locations determined by tags placed in the page description HTML, in another embodiment, content data may be placed in fixed slots which are pre-determined at the time of the mobile terminal's 100 configuration. An example of such a location would be a fixed slice of screen area, above the soft keys area and below the main applications pane. This area can be identified by associating it with a tag type, for example <category1>ScreenSpace</category1>. It will be understood that such a slot could be of any shape (including non-rectangular), and could be in any screen position. The nature of the slot (shape, size, transparency attributes) can be itself be controlled and changed by use of a suitable command channel. It will be understood that the arrangement can be extended to encompass multiple slots. Received content bearing such a tag type would always be located in that slot. Multiple items of received content that match that tag type might be displayed sequentially or randomly. Alternatively, the area visibly behind the main application pane can also be designated as a fixed slot. This location allows material to be displayed faintly but constantly in the central background of any or all pages, in the manner of a faint watermark on a piece of paper.

some UI technologies make it possible for the user or operator to change the theme of a mobile terminal's 100 UI (sometimes referred to as the UI skin). This can be achieved either by selection from a pre-installed set of skins that are pre-installed within the handset, by downloading new skins to be installed into the handset from local or remote networks, or via a plug-in device such as a smart skin (see, for example, our co-pending application GB0128654.1 or the Smart Skin product manufactured by Wildseed Ltd.). The installation module may be compatible with such a system, and can take priority over it in the UI hierarchy by forcing persistence. Thus, downloaded material that has been installed should remain present and visible after a change of skin, although the appearance of the material may have been changed by the application of the new skin. Optionally, downloaded material may include an additional characteristic tag to indicate whether the item will remain present and visible after the application of a new skin, or whether the new skin will cause the content to not be displayed.

Downloaded theme changes may also include sound events as a part or the whole of their content. Sound events that are subject to updating can include without restriction ring tones (as are already in wide use), message alerts, battery state indications, key press tones, game tones, cover opening/closing tones, start-up/shut-down tones, signal level and radio coverage alerts, time alarms, calendar events, error conditions, or any combination of the above, such as a special tone to indicate start-up whilst conditioned by a message outstanding in an inbox. These may used in isolation or can be linked to a graphic display event.

If a user selects content to be downloaded then it should be transmitted in response to the user's request, unless the user requests transmission to be deferred. However, if a content or network provider is 'pushing' content to the mobile terminal 100 then it is preferable if this to occur in the background without inconveniencing the user, for example at night time or in accordance with typical usage patterns. This content pushing may be suspended if the user makes use of the mobile terminal 100.

Distribution of installed content may be unique to a specific handset (uniquely addressed), or the same content may be multicast or broadcast to many handsets, using known transmission techniques. Installed content may be conveniently carried within a multimedia message, such as the Multimedia Message System (MMS) with the remote content being carried in the MMS and using a unique MIME (Multipurpose Internet Mail Extensions) type, such as x-vnd.3glab-triglet. EMS (Extended Messaging System) and WAP pushing are also suitable distribution mechanisms.

The mobile terminal 100 may not always be within network radio coverage (being out of service area, in a tunnel, etc). By including a certain amount of viewable local content, the user is protected to some extent from being out of coverage. For example, he can still read the news headlines, even if he cannot follow the link to access further details. In such a situation, links that are inaccessible because, for example, the handset is out of network radio coverage are clearly indicated to the user in a visible fashion, for example include rendering the links in a different colour font or making it impossible to select the link.

This change can be performed by the UI engine 150, which receives an input signal from the radio subsection, indicating the status of the wireless data link, and uses this signal to modify the visible attributes of links before delivering the content to the local browser. This modification could he achieved by changing the stored database, for example to change the link text colour to grey of all remote links within all pages, or alternatively, the text color of remote links can be modified 'on the fly' prior to rendering. In either case, it is necessary to distinguish local content from remote content. This may be achieved by checking for http:// in the link (which is a pre-requisite for pointing to a non-local resource), having all local links use the Internet Protocol address 127.0.0.1 (which by convention is used to identify local host) or by arranging that local links omit the hostname, e.g. /localdirectory/page.html.

In addition to content such as text, audio or video, the present invention can be used to install Java-based application programs into the mobile terminal 100. The Java 2 Micro Edition (J2ME) provides a platform through which a Java Virtual Machine (VM) can be created within the mobile terminal 100, despite the mobile terminal 100 having significantly reduced capabilities when compared with a personal computer. Java compliant applications, commonly referred to as applets, can be executed within the VM, enabling an applet to function across a number of different platforms (as long as the platform is capable of supporting a VM). Applets that are properly constructed using J2ME are compatible with the other Java variants and thus such an applet can be executed by any mobile terminal 100, from a mobile telephone to a desktop personal computer. In order to assist the compatibility of applets when executed across a range of mobile terminals 100, such as cellular telephones, that may have significantly different capabilities, such as processor speed, memory, display size, etc. a Mobile Information Device Profile (MIDP) has been specified. Applets that comply with MIDP are commonly referred to as MIDlets.

Users of mobile terminals 100 are likely to have a need to dynamically install and uninstall MIDlets, whilst handset manufacturers and network operators will wish to supply handsets that have pre-installed MIDlets. Furthermore, service and content providers will wish to "push" MIDlets to mobile terminals 100 in the hope that users will then pay for access to further MIDlets or other forms of content.

MIDlets can be instantiated by, for example, a user selecting a highlighted icon or text segment using the keypad of the mobile terminal. The MIDlet will then be executed within the Java VM, responding appropriately to any user input or data received from an external source, for example a database stored within the terminal or on a remote server.

Within a development environment a MIDlet can be instantiated by entering the name of the MIDlet at the command line. Clearly this is not suitable for a mobile terminal, which may have a restricted keypad, so a more suitable mechanism for instantiating the MIDle; must be provided, for example a hyperlinked icon or text label. This allows a hyperlink for a MIDlet to be inserted anywhere within a UI, as discussed above. MIDlets Can be provided with an identification (ID) tag that can be used as the basis for the identifying hyperlink.

MIDlets may be installed locally within the mobile terminal 100 or the mobile terminal 100 may store the ID for a remotely located MIDlets. If the ID for a remotely located MIDlet is selected then the mobile terminal 100 will download the MIDlet, install and run the MIDlet (if the user does not have sufficient access rights then the MIDlet may uninstall or delete itself once its execution has been completed).

The use of the methods outlined above in the context of installing content can be used to install MIDlets, providing a number of distinct, advantages for the user. For example, the user can access their favorite MIDlets directly from convenient points in the UI, allowing the user to link contents with associated MIDlets, rather than having to navigate to a special MIDlet page or service. Also, it is more convenient for the user to have a MIDlet provided by the installation of an ID item, compared with having to navigate to a MIDlet portal, manage the download process and then run the MIDlet as a separate program. This in turn makes it easier for developers or operators to promote new MIDlet-based applications or services as it is only necessary to install suitable MIDlet IDs within user UIs rather than having to install the MIDlet itself.

Further similarities may include that if network coverage is not available to a mobile terminal 100, then the ID hyperlink can be 'greyed out' to indicate that the MIDlet is unavailable. The MIDlet may have a 'Category' tag that defines the most relevant place that MiLlet may be stored within the UI, or the UI may be placed in a predetermined fixed slot. The MIDlets (or their IDs) may comprise tags that enable (or forbid) the user to delete and/or share the MIDlet, aid a MIDlet ID can be installed onto pages that themselves have been installed previously by the downloading of remote content (see above).

Whilst it is possible to install (and then uninstall) a MIDlet ID for a MIDlet that is remotely located without having to having to install the MIDlet itself, a MIDlet ID for a locally stored MIDlet must be installed and uninstalled in track with the corresponding MIDlet.

In contrast to the methods described above, where the remote content can take many forms, the downloaded data will be Java code content, typically in the Java Archive (JAR) format. The invention can also be used to install MIDlet suites, which comprise a plurality of MIDlets into the UI of a mobile terminal.

FIG. 4 shows an example of how local content and remote content can be presented on the mobile terminal 100. FIG. 4a shows a number of links, some of which are to local content (i.e. calendar data) and some of which are to remote data (i.e. a taxi service and a dating service). FIG. 4b shows the result of 'focussing' on the dating service link (i.e. positioning a cursor or other selection device over the link without selecting it. Once the link is selected, remote content must be downloaded and FIG. 4c shows a page that is displayed whilst the remote content is being acquired. Preferably this page is stored locally, but if it is stored remotely then it should be designed to download in as little time as possible. FIG. 4d shows a page of remote content that has been delivered to the mobile terminal.

It will be understood that the present invention is suitable for application with all manner of mobile terminals 100, and not just with simple mobile telephones. Even before mobile use of the internet and remotely stored data has become ubiquitous it is possible to purchase personal digital assistants (PDAs) that have mobile communications capabilities (for example the RIM BlackBerry, Nokia 9210 Communicator, Palm i705 etc.) or mobile phones with functionality not previously found in such devices (for example the Nokia 5510 & 7650 or the Ericsson T65). In the future it is likely that mobile devices will continue to be developed and for their functionality to widen, with less of a distinction between PDAs and mobile telephones. It should be appreciated that the present invention is applicable to all of these sorts of devices and also to laptop and portable computers that have a modem enabling mobile communications.

The present invention may be implemented over virtually any wireless communications network 200, for example second generation digital mobile telephone networks (i.e. GHSM, D-AMPS), so-called 2.5G networks (i.e. GPRS, HSCSD, EDGE) and third generation UMTS networks. Within buildings and campuses other technologies such as Bluetooth or wireless LANs (whether based on radio or optical systems) may be used.

Computer software for implementing the methods described above, the UT engine 150 and/or the installation module 140 may be provided on data carriers such as floppy disks, CD-ROMS, non-volatile memory cards, etc.

APPENDIX A

```
<?xml version="1.0" ?>
<triglet>
<ID>1234-83745-5554-qjy</ID>
<category>
    Sports
    <class>
        Advert
    </class>
</category>
<start>2002-01-13 06:30:00 +0000</start>
<expire>2002-01-17 17:30:00 +0000</expire>
<rights>
    <no_delete/>
    <no_share/>
</rights>
<html>
<body>
<li><a
href="http://www.tickets4sale2u.com/special/wim/">Click
for great Wimbledon ticket offer!</a></li>
</body>
</html>
</triglet>
```

What is claimed is:

1. A method of processing updated content data on a mobile terminal, the method comprising:
   storing local content data on the mobile terminal, the local content data comprising local characteristic data and a local data payload;
   selecting the local content data;
   determining on the mobile terminal whether remote content data is required to update the local content data based, at least in part, on time information included in the local content data, wherein the remote content data has remote characteristic data similar to the local characteristic data;
   receiving the remote content data at the mobile terminal in response to determining based on the time information that remote content data is required to update the local content data;

installing received remote content data within the local content data, the installed remote content data and local content data being updated content data; and presenting the updated content data, wherein the local content data is accessible on the mobile terminal when the mobile terminal does not have access to a wireless communications network.

2. The method of claim 1, wherein the local content data and remote content data are displayed differently based on availability.

3. The method of claim 1, further comprising:

validating the received remote content data before installing the remote content data within the local content data, the validated remote content data being suitable for use with the mobile terminal.

4. The method of claim 1, wherein the determining on the mobile terminal whether remote content data is required is based in part on user preferences.

5. The method of claim 1, wherein the local content data is accessible free of charge and received remote content data is accessible for an additional charge.

6. The method of claim 5, wherein the received remote content data is classified at a first time as local content data and is subsequently accessible free of charge.

7. The method of claim 1, wherein the updated content data is presented at a start time.

8. The method of claim 1, wherein the updated content data expires after an expiry time and is no longer presented for access on the mobile terminal.

9. The method of claim 1, wherein the local characteristic data specifies a fixed slot for the installation of the remote content data, wherein the fixed slot is determined during configuration of the mobile terminal.

10. The method of claim 1, wherein the local characteristic data and remote characteristic data further comprises a content category, respectively.

11. The method of claim 10, wherein the content category corresponds to a menu structure into which the remote content data will be installed.

12. The method of claim 11, wherein the content category allows the remote content data to be referenced from multiple menu structures.

13. A mobile terminal, comprising:

means for storing local content data on the mobile terminal, the local content data comprising local characteristic data and a local data payload;

means for selecting the local content data;

means for determining on the mobile terminal whether remote content data is required to update the local content data based, at least in part, on time information included in the local content data, wherein the remote content data has remote characteristic data similar to the local characteristic data;

means for receiving the remote content data at the mobile terminal when it is determined based on the time information that the remote content data is required to update the local content data;

means for installing received remote content data within the local content data, the installed remote content data and local content data being updated content data; and means for presenting the updated content data, wherein the local content data is accessible on the mobile terminal when the mobile terminal does not have access to a wireless communications network.

14. The mobile terminal of claim 13, wherein the local content data and remote content data are displayed differently based on availability.

15. The mobile terminal of claim 13, further comprising:

means for validating the received remote content data before installing the remote content data within the local content data, the validated remote content data being suitable for use with the mobile terminal.

16. The mobile terminal of claim 13, wherein the means for determining on the mobile terminal whether remote content data is required comprises means for determining whether remote content data is required based in part on user preferences.

17. The mobile terminal of claim 13, wherein the local content data is accessible free of charge and received remote content data is accessible for an additional charge.

18. The mobile terminal of claim 13, wherein the received remote content data is classified at a first time as local content data and is subsequently accessible free of charge.

19. The mobile terminal of claim 13, wherein the updated content data is presented at a start time.

20. The mobile terminal of claim 13, wherein the updated content data expires after an expiry time and is no longer presented for access on the mobile terminal.

21. The mobile terminal of claim 13, wherein the local characteristic data specifies a fixed slot for the installation of the remote content data, wherein the fixed slot is determined during configuration of the mobile terminal.

22. The mobile terminal of claim 13, wherein the local characteristic data and remote characteristic data further comprises a content category, respectively.

23. The mobile terminal of claim 22, wherein the content category corresponds to a menu structure into which the remote content data will be installed.

24. The mobile terminal of claim 23, wherein the content category allows the remote content data to be referenced from multiple menu structures.

25. A non-transitory computer readable medium having stored thereon processor-executable instructions for processing updated content data on a mobile terminal configured to cause a processor to perform operations comprising:

storing local content data on the mobile terminal, the local content data comprising local characteristic data and a local data payload;

selecting the local content data;

determining whether remote content data is required to update the local content data based, at least in part, on time information included in the local content data;

receiving the remote content data at the mobile terminal when it is determined based on the time information that remote content data is required to update the local content data;

installing received remote content data within the local content data, the installed remote content data and local content data being updated content data; and presenting the updated content data, wherein the local content data is accessible on the mobile terminal when the mobile terminal does not have access to a wireless communications network.

26. The non-transitory computer readable medium of claim 25, wherein the local content data and remote content data are displayed differently based on availability.

27. The non-transitory computer readable medium of claim 25, wherein the stored processor-executable instructions are configured to cause a processor to perform operations further comprising:

validating the received remote content data before installing the remote content data within the local content data, the validated remote content data being suitable for use with the mobile terminal.

28. The non-transitory computer readable medium of claim 25, wherein determining on the mobile terminal whether remote content data is required is based on user preferences.

29. The non-transitory computer readable medium of claim 25, wherein the local content data is accessible free of charge and received remote content data is accessible for an additional charge.

30. The non-transitory computer readable medium of claim 29, wherein the received remote content data is classified at a first time as local content data and is subsequently accessible free of charge.

31. The non-transitory computer readable medium of claim 25, wherein the updated content data is presented at a start time.

32. The non-transitory computer readable medium of claim 25, wherein the updated content data expires after an expiry time and is no longer presented for access on the mobile terminal.

33. The non-transitory computer readable medium of claim 25, wherein the local characteristic data specifies a fixed slot for the installation of the remote content data, wherein the fixed slot is determined during configuration of the mobile terminal.

34. The non-transitory computer readable medium of claim 25, wherein the local characteristic data and remote characteristic data further comprises a content category, respectively.

35. The non-transitory computer readable medium of claim 34, wherein the content category corresponds to a menu structure into which the remote content data will be installed.

36. The non-transitory computer readable medium of claim 35, wherein the content category allows the remote content data to be referenced from multiple menu structures.

37. A mobile terminal, comprising:
a transceiver for receiving remote content data;
a display device;
a memory for storing local content data on the mobile terminal, the local content data comprising local characteristic data and a local data payload;
a user input device for selecting the local content data;
a processor configured to:
determine whether remote content data is required to update the local content data based, at least in part, on time information included in the local content data, wherein the remote content data has remote characteristic data similar to the local characteristic data;
receive the remote content data at the mobile terminal via the transceiver when it is determined based on the time information that remote content data is required to update the local content data;
install received remote content data within the local content data, the installed remote content data and local content data being updated content data stored on the memory; and
present the updated content data on the display device, wherein the local content data is accessible on the mobile terminal when the mobile terminal does not have access to a wireless communications network.

38. The mobile terminal of claim 37, wherein the local content data and remote content data are displayed on the display device differently based on availability.

39. The mobile terminal of claim 37, wherein the processor is further operable to:
validate the received remote content data before installing the remote content data within the local content data, the validated remote content data being suitable for use with the mobile terminal.

40. The mobile terminal of claim 37, wherein the determining on the mobile terminal whether remote content data is required is based in part on user preferences.

41. The mobile terminal of claim 37, wherein the local content data is accessible free of charge and received remote content data is accessible for an additional charge.

42. The mobile terminal of claim 41, wherein the received remote content data is classified by the processor at a first time as local content data and is subsequently accessible free of charge.

43. The mobile terminal of claim 37, wherein the updated content data is presented at a start time.

44. The mobile terminal of claim 37, wherein the updated content data expires after an expiry time and is no longer presented for access on the mobile terminal.

45. The mobile terminal of claim 37, wherein the local characteristic data specifies a fixed slot for the installation of the remote content data, wherein the fixed slot is determined during configuration of the mobile terminal.

46. The mobile terminal of claim 37, wherein the local characteristic data and remote characteristic data further comprises a content category, respectively.

47. The mobile terminal of claim 46, wherein the content category corresponds to a menu structure into which the remote content data will be installed.

48. The mobile terminal of claim 47, wherein the content category allows the remote content data to be referenced from multiple menu structures.

49. The method of claim 1, wherein the time information is an expiration time related to the local content data.

50. The method of claim 1, wherein the time information is an availability time related to the remote data.

51. The method of claim 1, wherein installing the remote content data within the local content data comprises inserting the remote content data within previously downloaded content data within the local content data or overwriting previously downloaded content data within the local content data.

52. The mobile terminal of claim 13, wherein the time information is an expiration time related to the local content data.

53. The mobile terminal of claim 13, wherein the time information is an availability time related to the remote data.

54. The mobile terminal of claim 13, wherein the means for installing the remote content data within the local content data comprises means for inserting the remote content data within previously downloaded content data within the local content data or means for overwriting previously downloaded content data within the local content data.

55. The non-transitory computer readable medium of claim 25, wherein the time information is an expiration time related to the local content data.

56. The non-transitory computer readable medium of claim 25, wherein the time information is an availability time related to the remote data.

57. The non-transitory computer readable medium of claim 25, wherein installing the remote content data within the local content data comprises inserting the remote content data within previously downloaded content data within the local content data or overwriting previously downloaded content data within the local content data.

58. The mobile terminal of claim 37, wherein the time information is an expiration time related to the local content data.

59. The mobile terminal of claim 37, wherein the time information is an availability time related to the remote data.

60. The mobile terminal of claim 37, wherein installing the remote content data within the local content data comprises inserting the remote content data within previously downloaded content data within the local content data or overwriting previously downloaded content data within the local content data.

* * * * *